United States Patent [19]

Smith et al.

[11] 4,236,845

[45] Dec. 2, 1980

[54] SOCKET ASSEMBLY FOR A BALL AND SOCKET COUPLING

[75] Inventors: Lawther O. Smith, Doylestown, Pa.; Timothy L. Howard, Beach Haven, N.J.; Kalman Broitman, Dresher, Pa.

[73] Assignee: Gas Spring Corporation, Montgomeryville, Pa.

[21] Appl. No.: 49,316

[22] Filed: Jun. 18, 1979

Related U.S. Application Data

[63] Continuation of Ser. No. 953,763, Oct. 23, 1978, abandoned.

[51] Int. Cl.³ .................. F16C 11/00; F16D 1/12
[52] U.S. Cl. ............................... 403/144; 403/138
[58] Field of Search ............ 403/122, 136, 138, 144, 403/90, 56

[56] References Cited

U.S. PATENT DOCUMENTS

| | | | |
|---|---|---|---|
| 3,759,555 | 9/1973 | Ito | 403/122 |
| 3,856,422 | 12/1974 | Trefry | 403/122 |

FOREIGN PATENT DOCUMENTS

| | | | |
|---|---|---|---|
| 2043654 | 3/1972 | Fed. Rep. of Germany | 403/144 |
| 1556762 | 12/1968 | France | 403/144 |

*Primary Examiner*—Wayne L. Shedd
*Attorney, Agent, or Firm*—Brumbaugh, Graves, Donohue & Raymond

[57] ABSTRACT

A socket assembly for a ball and socket coupling comprises a socket body having a ball-receiving socket which includes a cylindrical portion. A pair of slots extend through the socket body and open into the cylindrical portion at locations diametrically opposite each other and outwardly from the seated position of the ball. Each slot has a flat surface which generally faces the seated position of the ball and converges inwardly toward the axis of the cylindrical portion of the socket, thus to lie obliquely to the axis of the cylindrical portion. A generally C-shaped spring clip wraps around the socket body. The clip has opposed end portions which extend through the slots and part way into the socket far enough to engage the neck of the ball component. The end portions of the clip are oriented generally obliquely to the axis of the socket. The socket body has a pair of external flat surfaces which underlie the clip, and the clip has flat portions which engage the flat faces of the socket body to keep the clip from turning out of proper position to permit the socket assembly to be pressed onto the ball component.

6 Claims, 6 Drawing Figures

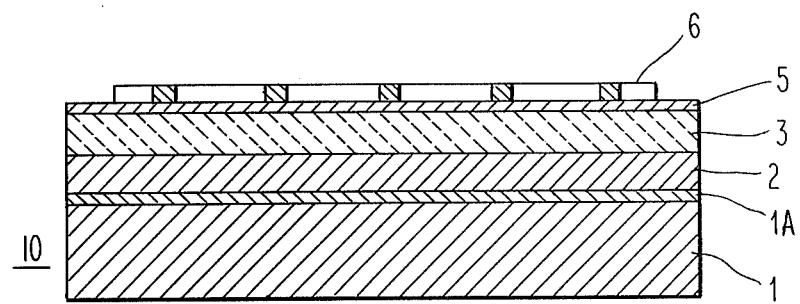

SOCKET ASSEMBLY FOR A BALL AND SOCKET COUPLING

This is a continuation, of application Ser. No. 953,763, filed Oct. 23, 1978 now abandoned.

BACKGROUND OF THE INVENTION

The present invention is a socket assembly for use in a ball and socket coupling.

Ball and socket couplings are widely used in mechanical linkages for transmitting force and motion. They have the advantage of providing unlimited rotation of the socket opening about the axis of the ball component and of permitting limited rocking motion about all axes perpendicular to the axis of the ball component. They are, accordingly, useful in linkages which are subject to misalignments and that involve compound motions. For example, ball and socket couplings are presently in use for connecting gas springs between car bodies and hatchback doors, trunk lids, engine compartment hoods and station wagon tailgate doors. In these and other uses, ball and socket couplings are well suited to the compound motions of the gas spring linkage and to the minor misalignments that occur in assembly of the vehicle.

A ball and socket coupling currently in use with gas springs includes a socket component which consists of a metal socket body having a ball-receiving socket and a generally C-shaped spring clip which fits over the socket body and has opposed end portions which pass through slots in the body and protrude part way into the socket far enough to capture the ball. The end portions are flat and lie in a common plane perpendicular to the axis of the socket. The slots are also aligned perpendicular to the axis of the socket, and the ball has an annular flat surface for engaging the protruding ends of the spring clip.

The above-described ball and socket coupling has proved quite satisfactory in operation. It is, however, comparatively expensive to manufacture. Moreover, the final assembly procedure involves pressing the socket assembly onto the ball stud, and it was found necessary to use hardened steel ball studs to prevent the spring clip from galling normal steel balls. Installation also requires a relatively high push-on force and some problems have occurred when the spring clip was not properly oriented on the socket body at final installation. For example, if the spring clip was rotated so that the extents of projection of the two ends into the socket were significantly different, the clip end which projected the greater distance into the socket would simply be folded up into the socket, and the coupling would thereby be rendered inoperable.

SUMMARY OF THE INVENTION

There is provided, in accordance with the present invention, a socket assembly for use in a ball and socket coupling which can be manufactured at lower cost than the one described above and which has significant operational advantages over the one described above. Among the advantages are a significant reduction in the push-on force required to assemble the coupling, a pull-off force comparable to the previous coupling even though the body is made of plastic rather than metal at lower cost, greater ease of disassembly for replacement and less susceptibility to failure on assembly of the coupling.

A socket assembly, according to the present invention, comprises a socket body having a ball-receiving socket which includes a cylindrical portion. A pair of slots extend through the socket body and open into the cylindrical portion at locations diametrically opposite each other and outwardly from the seated position of the ball. Each slot has a flat surface which generally faces the seated position of the ball and converges inwardly toward the axis of the cylindrical portion of the socket, thus to lie obliquely to the axis of the cylindrical portion. A generally C-shaped spring clip wraps around the socket body. The clip has opposed end portions which extend through the slots and part way into the socket far enough to engage the neck of the ball component. The end portions of the clip are oriented generally obliquely to the axis of the socket. The socket body has a pair of external flat surfaces which underlie the clip, and the clip has flat portions which engage the flat faces of the socket body to keep the clip from turning out of proper position to permit the socket assembly to be pressed onto the ball component.

In a preferred embodiment, each end portion of the spring clip is convexly curved in profile, relative to the flat surface of the slot receiving it. The end of each convexly curved end portion engages the neck of the ball, and each convexly curved end portion engages the flat surface of the slot in the socket body at a location outwardly, relative to the axis of the socket, from the edge where the flat surface of the slot intersects the cylindrical portion of the socket. The flat surface of each slot lies in a plane which intersects the socket axis at an angle of about 55°.

The orientation of each slot oblique to the axis of the socket provides, all other things being equal, a significant increase in the cross-sectional area, in radial planes relative to the axis of the socket, of the section of the socket body lying between the slot and the base of the socket body. The failure mode of a pull-off test in which the ball is pulled from the socket along the axis of the socket is by fracture of the material along the aforementioned cross section; when the ball is pulled from the socket, the ends of the spring clip become wedged between the ball and the segment of the socket body outwardly toward the base of the socket body from the slot. The spring end has no place to go, so it ultimately forces a fracture in this cross section. In the previous socket assembly in which the slots are oriented perpendicular to the socket axis, the cross section where failure occurs is significantly less merely because of the geometry of the slot. The present invention, by providing an increase of cross-sectional area at the zone of potential failure in a pull-off situation, provides, solely because of the change in geometry, a greater strength to resist pull off, all other things being equal. As a practical matter, the advantage of the improved geometry makes it possible to use a lower cost material, notably plastic, for the socket body while still providing adequate retention force against pull off failure. If desired, the advantage afforded by the new geometry can be converted into higher pull-off strength in a coupling made of a stronger material or in a reduction in size of the socket body.

The invention also provides other forms of improved ball retention. In situations short of ultimate pull-off failure, a curvature of the end portions of the spring clip and the engagement of the curved portion with the flat surfaces of the slot away from the internal edge of the slot means that a force imposed on the spring clip in a pull-off situation is applied evenly over a surface rather than in a concentrated area at an edge. The curved portions of the clip tend to flatten and spread the force over the flat surface of the slot. The possibility for high concentrated stresses which could lead to local failure of the material is essentially eliminated. Another form of improved function involves the tendency in a pull-off situation for the ends of the spring clip to cup transversely and to thus resist bending. In the previous design, the ends of the clip engage the annular flat surface of the ball and do not tend to cup. Instead they tend to bend along a transverse line along the edge of the slot. Forces are highly concentrated at either side of the edge where the slot intersects the socket. Thus, the tendency of the spring clip ends to cup and resist bending and the load spreading over the oblique flat surface of the slot improve retention in situations short of pull-off failure.

The geometry of the slots and the spring clip also, as mentioned above, reduce the push-on force required to push the socket assembly onto the ball. In the previous design, in which the ends of the spring clip lie generally in a plane perpendicular to the axis of the socket, the resultant force exerted by the spring clip and due to the resiliency of the clip itself and friction between the clip ends and the slots acts in a direction generally perpendicular to the axis of the socket. When the ball confronts the ends of the spring clip, the axial force to push the socket assembly on the ball required to overcome the resisting force of the spring clip and to move the ends of the clip back into the slots so that the ball can enter the socket is comparatively large. In the present invention, the orientations of the slots and the end portions of the spring clip oblique to the axis of the socket inherently orients the resultant resisting force of the spring clip obliquely to the axis of the socket. Therefore, it requires less axial force to push the socket assembly on the ball and produce components of a magnitude and direction acting on the spring clip ends to back the clip ends out of the socket and into the slots. The lower push on force reduces installation problems and may, in some cases, make it unnecessary to use hardened ball studs.

BRIEF DESCRIPTION OF THE DRAWINGS

For a better understanding of the invention, reference may be made to the following description of an exemplary embodiment, considered in conjunction with the figures of the accompanying drawings.

FIG. 1 is an end view of the socket body of the embodiment, with a portion broken away in section;

FIG. 2 is a top view of the socket body, some portions being shown broken away for clearer illustration;

FIG. 3 is a side elevational view of the socket body;

FIG. 4 is an end cross-sectional view of the socket assembly showing the spring in place, the section being taken along the axis of the socket, as indicated generally by the lines 4—4 in FIG. 2, and in the direction of the arrows;

FIG. 5 is also an end cross-sectional view taken along the axis of the socket but shows the socket assembly installed on a ball stud; and FIG. 6 is a top cross-sectional view of the socket assembly.

DESCRIPTION OF AN EXEMPLARY EMBODIMENT

The socket body of the embodiment may be made of any reasonably durable, rigid material, but it is advantageously produced by molding from a suitable rigid moldable polymeric material (plastic), for example, nylon. The external shape of the body is of no great importance and can be designed primarily with the objectives of minimizing the amount of material, providing an attractive appearance and maintaining strength and other characteristics tailored to the end use. In the embodiment shown in the drawings, the bottom and side external surfaces 10, 12 and 14, respectively, are generally flat and intersect at radiused corners. The top external surface (FIG. 2) is generally semi-cylindrical along the upper end and generally flat along the lower end, has a rib 16 along the lower end and has a groove 18 in the cylindrical surface near the upper end for receiving the spring clip. The upper end 20 is of generally hemispherical shape and the lower end 22 is flat.

A bore 24 that extends axially into the lower end portion of the socket body is provided to accept the end portion of the rod of the linkage or the operating rod of a gas spring or any other suitable element to which the socket assembly is to be attached. A pair of holes 26 pass through the lower end portion of the body adjacent diametrically opposite portions of the bore 24 and accept spiral spring pins which seat in a groove on the rod or link to secure the socket body to the rod or link.

A socket 30 having a cylindrical wall 32 and a hemispherical upper end 34 extends into the body from the bottom wall 10. The entrance 35 to the socket 30 is tapered inwardly from the wall 10 to facilitate guiding the ball into the socket and to accommodate tilting movement of the socket about axes perpendicular to the main axis of the socket.

The other component of the socket assembly is a generally C-shaped spring clip 40. The spring clip 40 is symmetrical about a bisecting plane which, in FIGS. 4 and 5, includes the main axis of the socket and lies perpendicular to the plane of the sheet of drawings. Each half of the spring clip includes a curved upper portion 42 which nests in the groove 18 in the socket body, a flat portion 44 and an end portion 46 which is convexly curved with respect to the flat surface 48 of a slot 50 through which the end portion 46 of the spring clip passes into the cylindrical portion of the socket. The flat surface 48 of each slot 50 generally faces the seated position of the ball (see FIG. 5) and converges inwardly toward the axis of the cylindrical portion of the socket, thus to lie obliquely to the main axis of the socket. In the illustrated embodiment the surface 48 of each of the slots 50 lies in a plane which intersects the axis of the socket at an angle of 55°. The flat surfaces 48 of the two slots 50 in the socket body lie in planes that intersect each other along a line that intersects and is perpendicular to the axis of the socket.

The outer portion of each slot 50 (outer relative to the socket axis) extends toward the upper or head end 20 of the socket body (see and compare FIGS. 1, 2 and 3 of the drawings) so that the clip need only be opened up to a dimension approximately equal to that represented by the arrowed lines D in FIG. 1 to permit it to be slided from the head end 20 lengthwise into a position in which it will then snap into place within the groove 18 in the socket body with the end portions 46 passing through the openings and protruding into the cylindrical portion of the socket. The extension of the slot profile in the lengthwise direction along the head portion of the socket body also provides a convenient way of examining the socket assembly visually to see that the spring clip is in proper position by merely looking at it lengthwise from the head end, i.e., in the direction illustrated in FIG. 1.

Each of the slots 50 has a thickness (in the direction perpendicular to the spring clip) somewhat greater than the thickness of the spring clip. The spring clip is of uniform thickness and width throughout its extent. The large clearance between each end portion 46 and the slot 50 in the thickness direction increases the freedom of motion of the clip when the socket assembly is pushed onto the ball stud and when the socket tends to rock in operation of the assembled coupling. The width of each slot opening into the recess (the dimension labeled W in FIG. 2) is substantially equal to the width of the clip. Accordingly, the end portions 46 of the clip are held in position lengthwise of the socket body. The shoulders 18a and 18b (FIG. 2) on either side of the recess 18 are also substantially equal to the width of the clip, thus retaining the top curved portion of the clip in position in the lengthwise direction.

As may be seen in FIG. 4 of the drawings, the socket body includes spaced-apart flat faces 52 which underlie the flat portions 44 of the spring clip 40. The faces 52 converge slightly toward each other in a direction towards the opening to the socket. The flat portions 44 of the clip tend to be self-seating on the faces 52, and because the faces 52 slightly converge in a direction away from the curved top end of the clip, engagement between the flat portions 44 and the faces 52 under a pre-loading of the clip in the position shown in FIG. 4 results in the clip pulling itself into the position shown in FIG. 4 when it is installed on the socket body.

Each end 60 of the spring clip engages the neck end of a ball stud B to which the socket assembly is connected in the assembled ball and socket coupling and is rounded to match generally the curvature in cross-section of the part of the neck which it engages (see FIG. 6). Since the gap between the ends 60 of the spring clip as installed on the socket, as shown in FIG. 4, is smaller than the diameter of the neck of the ball stud B, when the ball stud B is in place the clip is slightly expanded from its configuration when the ball stud is not in place (compare FIGS. 4 and 5). As illustrated in FIG. 5, this results in an expansion of the spring clip such that in the normal non-pull out situation, the clip is entirely free-floating with respect to the flat faces 52, the base of the groove 18, and flat surfaces 48 and 50. This free-floating clearance situation allows the clip to follow the movement of the ball stud while maintaining the clip ends 60 in contact with the neck of the ball stud. Under pull-out load conditions, the ball stud urges the convexly curved clip portions 46 against the oblique flat surfaces 48. Due to the coaction of the oblique flat surfaces 48 and the convexly curved clip portions 46, the clip nonetheless is able to maintain contact with and follow the movement of the ball stud B even under pull-out load conditions. This overcomes the problem encountered in prior art couplings, wherein the clip tended to spread under pull-out load conditions, thereby, losing contact with the ball stud and permitting the ball stud to snap out of the socket.

The socket assembly is installed on the ball stud B by merely pushing the assembly onto the ball of the stud with a force generally in a direction aligned with the axis of the socket. When the ball encounters the ends 60 of the spring clip, the spherical surface of the ball cams the ends of the clip outwardly to force the end portions 46 back out of the socket into the slots until the ball can pass by and fully seat in the socket. The oblique orientations of the slots 50 in the socket body and the general orientations of the end portions 46 of the clip oblique to the axis of the socket provide favorable resultant resisting force conditions which facilitate pushing the end portions of the clip out of the socket and into the slots so that the ball is accepted into the socket.

When a pull-out force is exerted on the coupling tending to pull the ball out of the socket, the annular flat surface on the underside of the ball engages the end portions of the spring clip. (The flat surface on the ball is optional; the ball may have a spherical surface intersecting the neck of the ball stud.) Since the clip is flat in the widthwise direction while the portions of the ball which engage the clip are circular, the engagement between the end portions of the clip and the ball are points or zones generally in the center of the spring clip located a short distance inwardly from the cylindrical surface of the socket. A pulling force tending to pull the ball out of the socket causes the spring clip portions 46 be deformed and deflected and, in fact, somewhat flattened out lengthwise, thus bringing about a zone or region of contact by more or less a rolling action of the spring clip portions 46 along the flat surfaces 48 of the slots through the socket body. In addition to permitting the clip to follow the ball stud neck as aforementioned, the flattening and rolling action of the spring clip portions 46 against the surfaces 48 provides good load-spreading and minimizes localized high stresses.

The line of intersection between the flat surface 48 of each slot and the cylindrical wall of the socket forms an arcuate edge which lies in a plane oblique to the main axis of the socket. When the clip end portion flattens out enough to engage the lower edge of the surface 48, a portion of the end portion of the clip immediately adjacent to the slot edge bridges widthwise between the ends of that edge (see FIG. 6). Recalling that the ball engages a point near the middle of the clip near the slot edge, it should now be apparent that there is a tendency for the ball to produce a transverse cupping of the clip, a shape which is inherently more resistant to bending than is a flat shape. Accordingly, the distortion of the spring ends provides a relatively high resistance to bending, thus increasing the resistance of the coupling to ball pullout under less than failure loads.

The failure mode of the coupling is by fracture at the cross-sectional segments of the socket body between the lower edge 10 and the surfaces 48 of the slots. The cross-sectional area of this segment of the socket body is comparatively large, and thus the ultimate pull-out force is very high.

Thus there is provided, in accordance with the present invention, a socket assembly which has the advantages of permitting assembly to a ball stud with a relatively low push-on force while still being able to endure high pull-out forces. The improved geometry of the slots and the spring ensures reliability upon assembly of the coupling, facilitates visual inspection of the assembly, permits the coupling to be disassembled easily and affords substantial cost savings due to the ability to use lower cost materials, such as plastic, for the socket body and to minimize defective or damaged parts.

The above-described embodiment of the invention is intended to be exemplary and numerous variations and modifications can be made by those skilled in the art without departing from the spirit and scope of the invention. All such variations and modifications are intended to be included within the scope of the invention as defined in the appended claims.

We claim:

1. A socket assembly for a ball and socket coupling comprising a socket body having a ball-receiving socket which includes a cylindrical portion having a central axis, a pair of slots which extend through the socket body and open into the cylindrical portion of the socket at locations diametrically opposite each other and outwardly from the seated position of a ball received in the socket, each slot having a flat surface which generally faces the seated position of the ball and converges inwardly toward the axis of the cylindrical portion of the socket and thus lies obliquely to said axis, and a generally C-shaped spring clip received on the socket body, the clip having opposed end portions which extend through the slots in the socket body and part way into the socket far enough to engage a ball received therein and prevent it from being pulled out of the socket and which lie generally obliquely to the axis of the socket.

2. A socket assembly according to claim 1 wherein each end portion of the spring clip is convexly curved in profile relative to the flat surface of the slot receiving it, engages the neck of a ball in place in the socket and, under pull-out load conditions engages the flat surface at a location remote from the edge where the flat surface intersects the cylindrical portion of the socket.

3. A socket assembly according to claim 1 wherein the flat surface of each slot lies in a plane which intersects the socket axis at an angle of about 55°.

4. A socket assembly according to claim 3 wherein the planes in which the flat surfaces of the slots lie intersect each other at a line which intersects and lies perpendicular to the axis of the socket.

5. A socket assembly according to claim 1 wherein the socket body includes a pair of spaced-apart external flat faces which underlie the spring clip, and wherein the spring clip includes flat portions which resiliently engage the flat faces of the socket body when there is no ball in the socket, thus to keep the spring clip from turning during shipment and installation of the socket assembly on a ball.

6. A socket assembly according to claim 5 wherein the flat faces are symmetrically located adjacent the slots and are slightly convergent in a direction toward the end portions of the clip so that the clip tends to pull itself along the flat faces into a fully seated position.

* * * * *